(12) United States Patent
You (10) Patent No.: US 6,793,704 B2
(45) Date of Patent: Sep. 21, 2004

(54) WEAK ALKALINE ORGANIC FERTILIZER FROM ORGANIC WASTE INCLUDING FOOD WASTE AND ITS MANUFACTURING METHOD

(76) Inventor: Kyu Jae You, Chang-mi-ma-ul Apartment 826-1102 Ya-tap-dong 335, Bun-Dang-Gu, Sung-Nam-shi Kyeong-ki-do (KR), 463-070

( * ) Notice: Subject to any disclaimer, the term of this patent is extended or adjusted under 35 U.S.C. 154(b) by 230 days.

(21) Appl. No.: 10/006,209

(22) Filed: Dec. 10, 2001

(65) Prior Publication Data

US 2003/0126898 A1 Jul. 10, 2003

(30) Foreign Application Priority Data

Dec. 12, 2000 (KR) .................................. 10-2000-0075389

(51) Int. Cl.[7] .................................................. C05F 5/00
(52) U.S. Cl. ........................ 71/11; 71/14; 71/15; 71/16; 71/23; 71/31; 71/61; 71/63
(58) Field of Search ................................ 71/11, 14, 15, 71/16, 23, 31, 61, 63

(56) References Cited

U.S. PATENT DOCUMENTS

| | | | | | |
|---|---|---|---|---|---|
| 3,877,920 A | * | 4/1975 | Carlberg | ......................... | 71/21 |
| 4,180,459 A | * | 12/1979 | Zievers | ......................... | 71/12 |
| 4,997,572 A | * | 3/1991 | Wurtz | ......................... | 210/710 |
| 5,196,043 A | * | 3/1993 | Wurtz | ......................... | 71/12 |
| 5,385,673 A | * | 1/1995 | Fergen | ........................ | 210/710 |
| 5,656,059 A | | 8/1997 | Monster et al. | ................... | 71/7 |
| 6,273,927 B1 | * | 8/2001 | Yang | ............................. | 71/11 |

FOREIGN PATENT DOCUMENTS

NL          8501262      * 12/1986

* cited by examiner

*Primary Examiner*—C. Sayala
(74) *Attorney, Agent, or Firm*—Troxell Law Office PLLC (57) ABSTRACT

A calcium-enriched organic fertilizer for acid soil and/or a magnesium-enriched organic fertilizer for field products and/or a silica-enriched organic fertilizer for paddy field products, and its manufacturing method. The method includes elimination of saline matters harmful to the soil and plants/animals from organic waste including food waste, adding quick lime and/or dolomite for hydration, and introducing a drying exhaust gas having a high $CO_2$ content generated from the factory, an exhaust gas from a line calcining kiln, or an out sourced $CO_2$ gas into a heretically sealed mixer, aging tank and hydration tank in the reverse order to cause a carbonation reaction between $CO_2$ and the dissociated ions of the additives to make the organic waste in a weak alkaline state, and adding a siliceous material. The present invention is also directed to a functional organic plant nutriment for high-value garden plants or lawn in golf links and its manufacturing method enabling utilization of environmental contamination-causing organic waste including food waste as a weak alkaline fertilizer in an economical way.

8 Claims, 5 Drawing Sheets

WEAK ALKALINE ORGANIC FERTILIZER FROM ORGANIC WASTE INCLUDING FOOD WASTE AND ITS MANUFACTURING METHOD

BACKGROUND OF THE INVENTION

1. Field of the Invention

The present invention relates to a weak alkaline organic fertilizer manufactured from organic waste including food waste and its manufacturing method.

2. Background of the Related Art

Sulfur compounds ($SO_x$) generated from combustion of fossil fuels react with $OH^-$ in the atmosphere into sulfuric acid ($H_2SO_4$), which causes acid rain and acid fog to acidify soils and streams and leaches out calcium ions ($Ca^{2+}$) from plants to cause a biological disorder of the plants.

Due to repeated cultivation, mass production-originated farming and continuous application of chemical fertilizers, the farm land is over concentrated phosphoric acid potassium while soil nourishment necessary to the soil, such as organism, lime, silicic acid or the like is in poverty that is unbalanced ingredients. Further-more continuous application of agricultural chemicals against the damage from disease and harmful insects that weaken the resistance and strength of the plants causes to be an issue of safety.

The more population explodes in the civilized life style, the more organic waste including food waste produces. Particularly, food waste causes a serious environmental contamination without rapid treatment because it has the high moisture content and is putrescible organics. The current treatment method primarily relies on land reclamation or cremation and partly on recycling as animal feeds or fertilizes. Land reclamation or cremation are considered as an imperfect treatment due to secondary environmental contamination, such as seepage water, offensive odor, dioxin, chlorine gas or dusts, and the NIMBY effect further high expense. Moreover, land reclamation is prohibited according to the related regulations from the year of 2005. The recycling of the organic waste as animal feeds or fertilizers is mainly based on an anaerobic/aerobic digestion method and a microorganism-based fermentation method which has its own limitations such as longer time requirement and the difficulty to estimate the degree of decomposition. Futher-more due to problems related with seepage water, offensive odor, toxic saline matters, or mad cow disease of plant-eating animals, the conventional recycling method is hardly activated. Thus the food waste treatment has become a serious issue in the society.

The recent lime-based hydration method in which quick lime or dolomite is mixed with organic waste including food waste for digestion enables to economically treat the organic waste on a large scale and is being widely attempted to apply in many areas in the aspect that the treated material neutralizes the acid soil improves, supplements deficient nutriments and improves the problems with the conventional treatment methods. However, the lime-based digestion method still has some problems in that the organic waste is not completely removed of the harmful saline matters and the lime-digested material is a strong alkali having a pH value of 12 to 13, which involves a difficulty in controlling the applied amount of the fertilizer, causes human diseases to the skin, eyes and respiratory organs through direct contact and destroys the plants and microorganism in soil. The lime-digested organic waste is thus required for aging for 2 to 3 months to stabilize the pH value to weak alkalinity in order to reduce the offensive odor. As such, the lime-based digestion method has not been in practical use with those unsettled problems.

SUMMARY OF THE INVENTION

Accordingly, the present invention is directed to a weak alkaline organic fertilizer manufactured from organic waste including food waste and its manufacturing method that substantially obviates unsettled problems from the limitations and disadvantages of the conventional treatment.

An object of the present invention is to provide a method for manufacturing a functional plant agent for garden plants or lawn in golf links, which method includes mixing a desalter with organic waste with agitating to completely de-compose saline matters from the organic waste, introducing a waste-drying exhaust gas having a high $CO_2$ content generated from lime hydration process, an exhaust gas from a lime calcining kiln, or a separate $CO_2$ gas into a mixer, a aging tank and a hydration tank in the reverse order to convert the strong alkaline calcium hydroxide ($Ca(OH)_2$) or magnesium hydroxide ($Mg(OH)_2$) to the neutral (weak alkaline) salt of calcium carbonate($CaCO_3$) and magnesium carbonate($MgCO_3$) through carbonation, thereby making it possible to readily apply the organic waste like a organic manure on a large scale in a safe way, adding a deodorizing substances useful to the plants to eliminate the olfactory offensiveness of the organic waste and enhance the plants' absorption of calcium, and adding aqueous necessary inorganic minerals to prevent the calcium deficiency of the plants and increase the plant's resistance and growth.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

The manufacturing process of the present invention will be described as follows.

Figure 1:
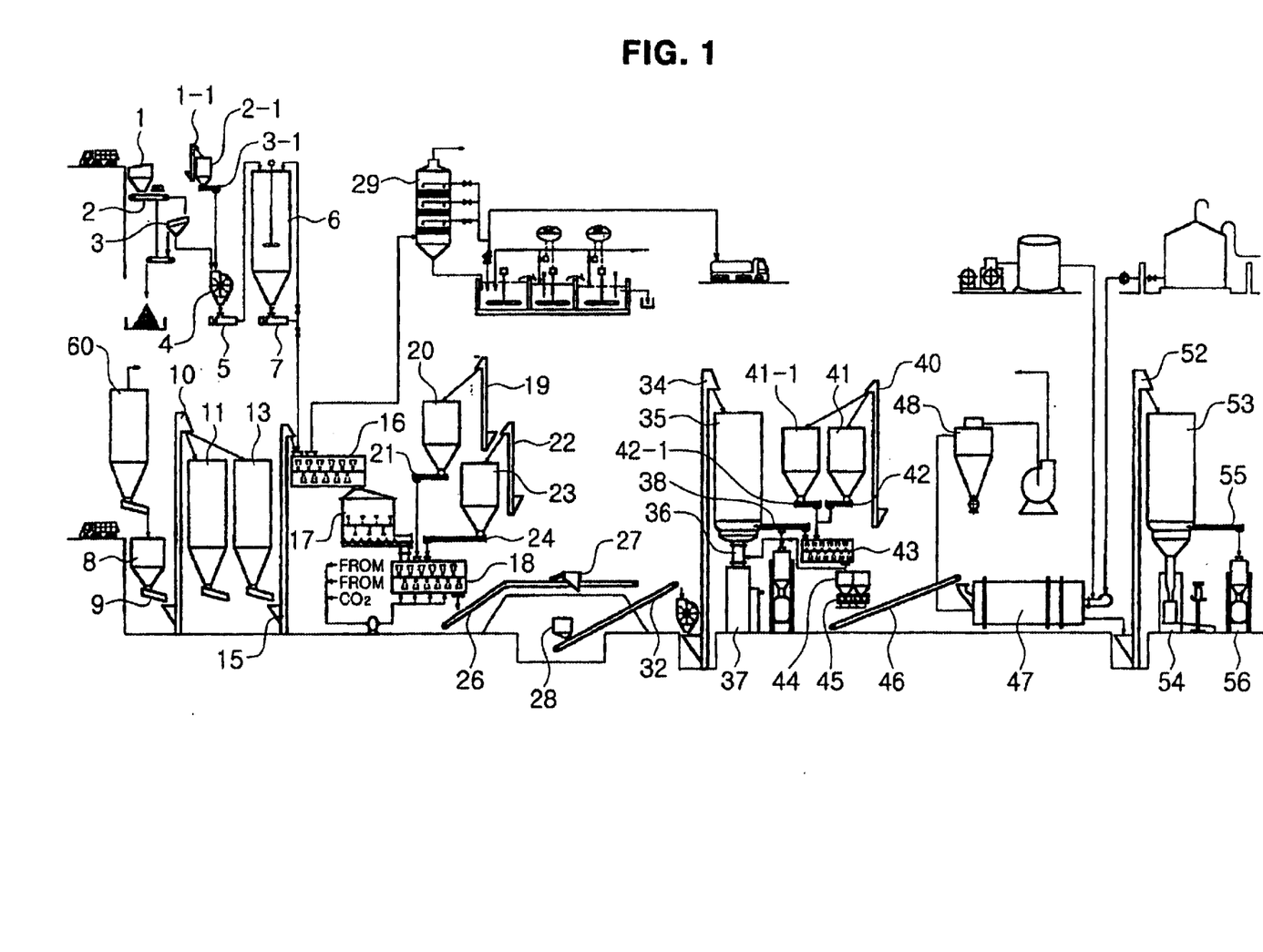
FIG. 1 illustrates a process for manufacturing a weak alkaline organic fertilizer according to the present invention.
Figure 2A:
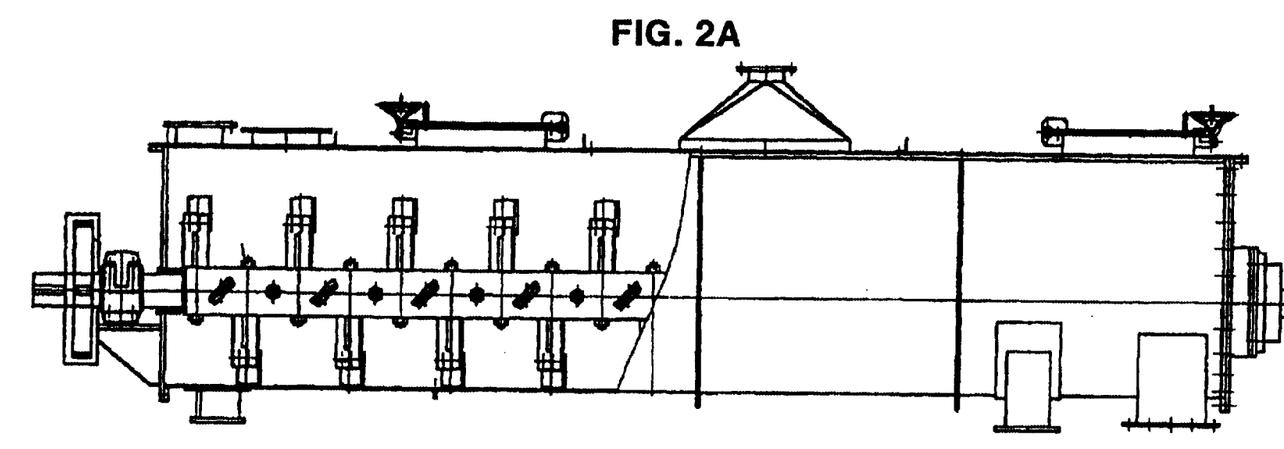
FIG. 2 illustrates an assembled view of a first reactor (hydration tank) 16 shown in FIG. 1.
Figure 2B:
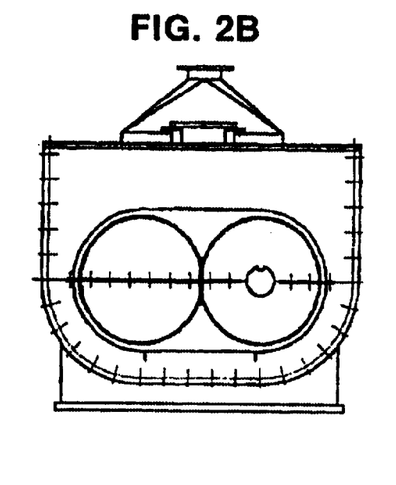
Figure 2C:
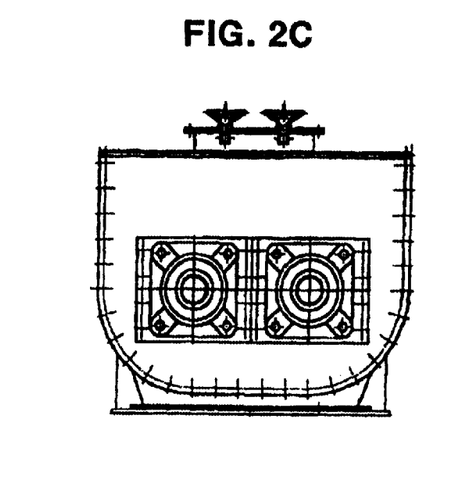
Figure 3:
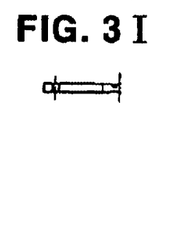
FIG. 3 illustrates an exploded view of the first reactor (hydration tank) 16 shown in FIG. 1.
Figure 3A:
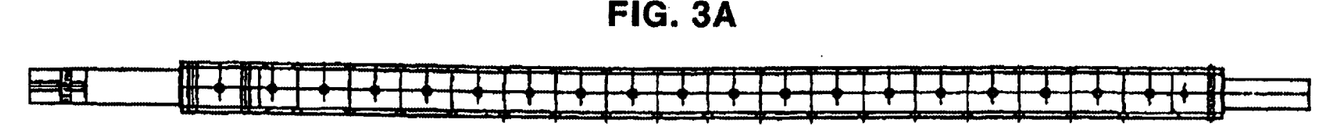
Figure 3B:
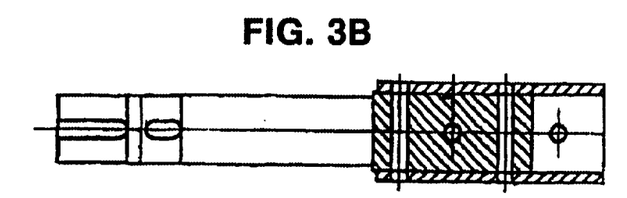
Figure 3C:
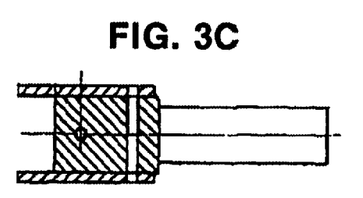
Figure 3D:
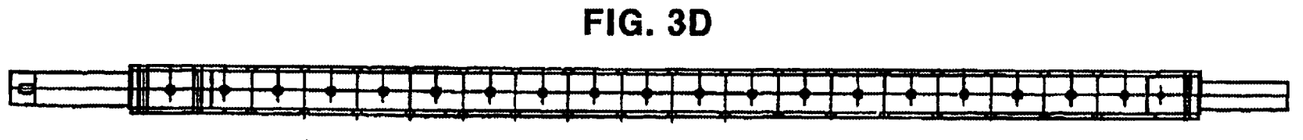
Figure 3E:
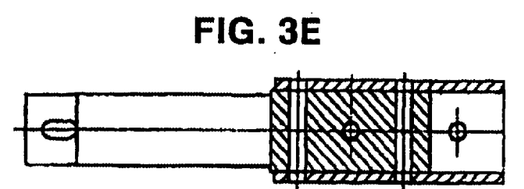
Figure 3F:
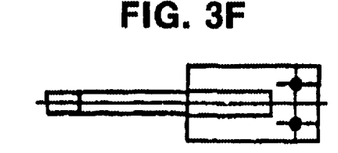
Figure 3G:
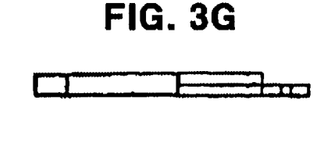
Figure 3H:
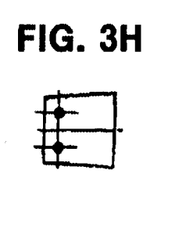
Figure 3J:
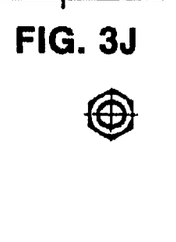
Figure 3K:
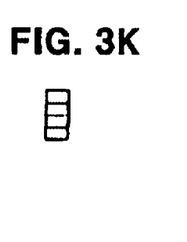
Figure 3L:
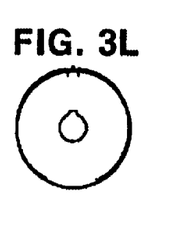
Figure 3M:
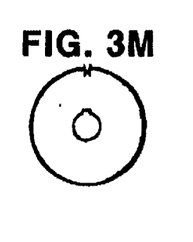
Figure 3N:
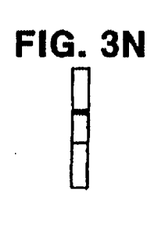
Figure 4A:
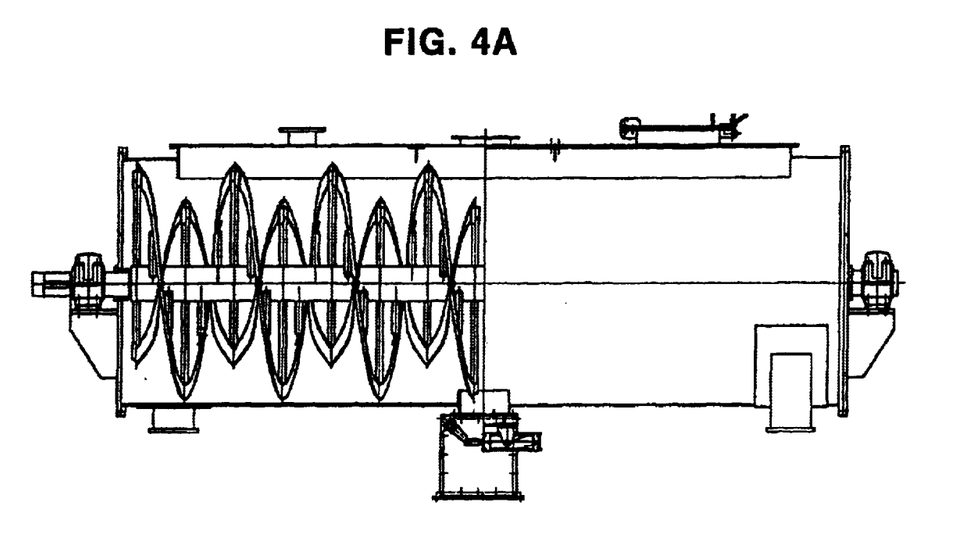
FIG. 4 illustrates an assembled view of a second reactor (aging tank) 17 shown in FIG. 1.
Figure 4B:
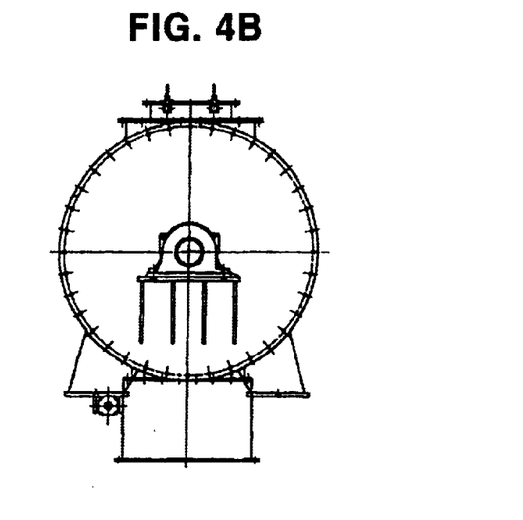
Figure 5:
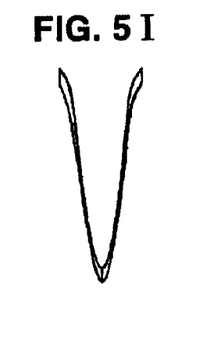
FIG. 5 illustrates an exploded view of the second reactor (aging tank) 17 shown in FIG. 1.
Figure 5A:
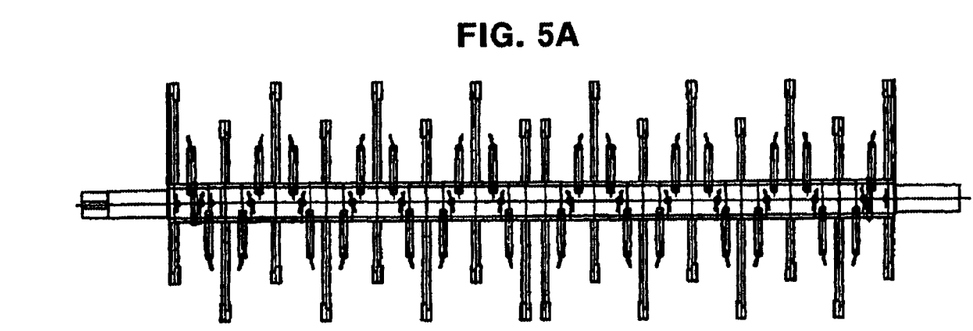
Figure 5B:
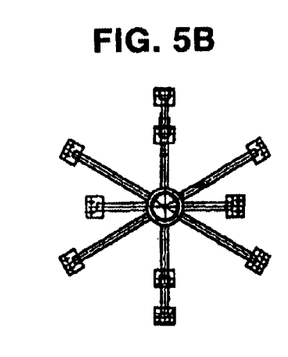
Figure 5C:
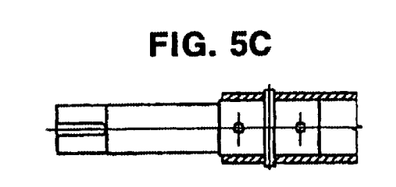
Figure 5D:
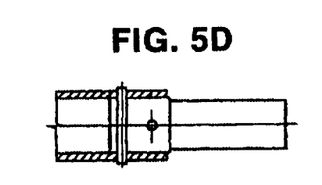
Figure 5E:
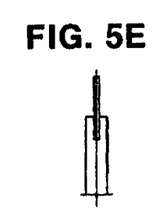
Figure 5F:
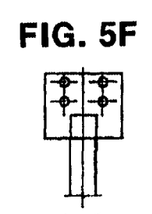
Figure 5G:
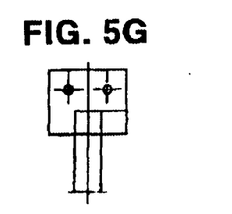
Figure 5H:
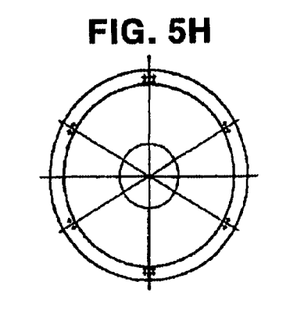
Figure 5J:
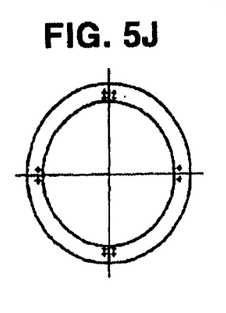
Figure 5K:
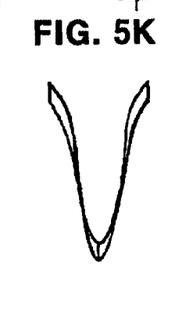

The organic waste including food waste collected is unloaded from trucks into an organic waste receiving hopper 1, removed of magnetic matters such as metal by a magnetic separator in a separating feed conveyor 2, removed of non-magnetic matters such as wood, plastic, vinyl or cloth through vibration and hand picking in a vibrating separator 3, and cut by a pulverizer 4. A desalter is stored in a desalter hopper 2-1 by a desalter receiving elevator 1-1, mixed with the organic waste, which is transferred to the pulverizer 4 by a screw conveyor 3-1 and pulverized at the pulverizer. The pulverized organic waste is then pumped into a storage tank 6 by a transfer monopump 5 and agitated at 60 rpm at the storage tank 6 for acceleration of desalting, as a result of which the saline matters contained in the organic waste is completely de-composed as an aqueous neutral salt, sodium sulfate $Na_2SO_4$.

For calcareous materials, quick lime and burnt dolomite, the product from a lime and/or dolomite calcining kiln 60 or an ordered product loaded on trucks is fed into a lime/dolomite receiving hopper 8 and transferred to silos 11 and 13 by a feeder 9 and bucket elevator 10. The first additives-lime, quick lime and dolomite are fed into a first reactor (hydration tank) 16 in a defined amount by a bucket elevator 15 and take place hydration with the moisture in the organic waste fed into the first reactor 16 by the monopump 7.

The resulting material of the lime hydration is aged at a second reactor(aging tank) 17 and transferred to a mixer 18. The second additives are transferred to the mixer 18 in a defined amount by receiving elevators 19 and 22, additive hoppers 20 and 23, and screw feeders 21 and 22, and mixed with the aged organic waste so as to manufacture a customized organic fertilizer. The second additives include a siliceous material; a carbon ingredient for promoting the growth of microorganisms and plants, such as graphite, active carbon or charcoal; clays for supply of micronutrient element; zeolite or bentonite for improving soil cation exchange capacity; sawdust for control of moisture absorption; and supplementary organic matters such as farmyard manure or the like.

The organic fertilizer thus manufactured is a strong alkaline fertilizer (pH 12–13) and thus dealkalized into a weak alkaline organic fertilizer that is safe and beneficial to the soil and plants even when it is applied in a large amount. For dealkalization, a $CO_2$-containing exhaust gas from a calcining kiln, a fuel combustion gas from a dryer, or an outsourced separate $CO_2$ gas is introduced into the mixer 18, the second reactor(aging tank) 17 and the first reactor (hydration tank) 16 in order by a strong blower and take place a carbonation of the hydrated lime and/or dolomite in the slurry form to produce a neutral saline matter such as $CaCO_3$ and/or $MgCO_3$ and thereby convert strong alkaline organic fertilizer to weak alkaline organic fertilizer.

The mixer, the second reactor and the first reactor used for carbonation are closed type other than transfer connection route and exhaust pipes are to provide the internal environment like a pressure oven with high temperature and pressure by heat and volume expansion caused by an exothermic reaction and the strong alkalinity which accelerate sterilize pathogenics and hydration and aging. The exhaust gas and vapor discharged from the first reactor are strong alkaline and thus condensed at an exhaust gas chilling tower 29 for the use purpose as a neutralizer for acidic wastewater.

The organic fertilizer prepared by mixing a variety of second additives alone or in combination with the organic waste weak-alkalized by the carbonation reaction is transferred in the form of a cake into a stock yard through conveyers 26 and 27 for additional aging and drying. From the stock yard, products can be shipped in the bulk form. The product is transferred to a hammer crusher for pulverization through a stock yard hopper 28 and a conveyer 32, a product tank 35 for storage by an elevator 34, and a packaging unit 37 for packaging by an extractor 36. Also, the product is transferred to a container packaging unit 39 for packaging as a container bag by a screw conveyer 38, or to a mixer 43 for being mixed with third additives, including a functionality provider for functional organic plant agent, a neutralizer for overconcentrated phosphoric acid and potassium, a binder or the like. These third additives are fed into hoppers 40 and 41-1 by an receiving elevator 40, transferred into the mixer 43 by the screw conveyer and mixed with the product. The mixture is transferred to the packaging unit 37 or the container packaging unit 38, granulized at granulation units 44 and 45, dried at a rotary dryer 47, transferred into a production silo 53 for storage by an elevator 52 and then packaged at a packaging unit 54 or container packaging units 55 and 56.

In the manufacturing process, the exhaust gases($CO_2$ content: 10 to 15%) from the rotary dryer 47 and that ($CO_2$ content: 25 to 30%) from the calcining kiln 60 are drafted to a blower and used as a raw material for carbonation.

Now, the present invention will be described in detail step by step.

First Invention: Decomposing of Saline Matters Contained in Organic Waste Including Food Waste.

Saline matters are harmful ingredients for a soil conditioner or a fertilizer that harden the soil and deteriorate the plants' absorption of nutriment and moisture. The saline matters are also harmful to feeds for cattle and poultry. So far, there is no economical desalting technology for eliminating saline matters from organic waste. In these point desalting from organic waste is critical for recycling. A desalter including natural gypsum, waste gypsum, calcium carbonate and calcium chloride is mixed with the organic waste in the slurry form and the mixture is agitated at a speed of 60 rpm to completely eliminate the saline matters from the organic waste in the form of an aqueous neutral salt. The mechanism for desalting is defined as follows:

(a) Desalting with waste gypsum ($CaSO_4$)
(b) Desalting with calcium carbonate ($CaCO_3$)

Second Invention: Dealkalization of Strong Alkaline Organic Waste.

An addition of quick lime and/or dolomite for hydration to the organic waste produces a strong alkaline fertilizer (pH 12–13). Applying such a strong alkaline organic fertilizer destroys the microorganisms living in the soil and does harm to the plants with a difficulty in controlling the amount of the fertilizer to be applied. To lower the pH value and make it possible to readily use a large amount of such a fertilizer safely as a farmyard manure, the present invention introduces an exhaust gas containing 25 to 30% of $CO_2$ from the lime kiln, a fuel combustion gas containing 10 to 15% Of $CO_2$ from the dryer or an out sourced separate $CO_2$ gas into the mixer, the aging tank and the hydration tank, which are used as a reaction tank for dealkalization to convert the strong alkaline organic fertilizer to a weak alkaline organic fertilizer through carbonation. To maximize the dealkalization, a separate carbonation reactor is installed right after the hydration reactor to introduce $CO_2$ into the mixer, the aging tank, the carbonation reactor and the hydration reactor in order and thereby dealkalize the organic fertilizer to have a pH value of 8.50 to 11.00. The reason that the carbonation reactor is installed is right after the hydration reactor is to increase the water solubility of $CO_2$ and accelerate the reaction between $CO_2$ and the hydrated lime in a good fluidity state with to high water content. The pH value is controlled in terms of the reaction time. After the carbonation reaction, a vibrating sieve or a centrifugal hydroextractor may be used in order to reduce water content and thus it is possible to increase the dry efficiency. The mechanism of carbonation is defined as follows:

(a) Carbonation with lime ($Ca(OH)_2$)
Reaction formula:

G energy:

$\Delta G = -265.8 - 56.69 \times 2 - (-214.75 - 56.69 - 94.26)$
$= -13.48 < 0$ (Forward reaction)

Enthalpy:

$\Delta H = -288.46 - 68.32 - (-235.70 - 68.32 - 94.05)$
$= -27.03 < 0$ (Exothermic reaction)
$= 27.03$ kcal/mol
$= 27.03 / 74.09 \times 1000$
$= 365$ kcal/kg-$Ca(OH)_2$
$= 27.03 / 100.09 \times 1000$
$= 270$ kcal/kg-$CaCO_3$ (b) Carbonation with hard dolomite ($Mg(OH)_2$)
Reaction formula:

G energy:

$\Delta G = -241.90 - 56.69 \times 2 - (-199.30 - 56.69 - 94.26)$
$= -5.03 < 0$ (Forward reaction)

Enthalpy:

$\Delta H = -261.90 - 68.32 \times 2 - (-221.00 - 68.32 - 94.05)$
$= -15.17 < 0$ (Exothermic reaction)
$= 15.17$ kcal/mol
$= 15.17 / 58.33 \times 1000$
$= 260$ kcal/kg-$Mg(OH)_2$
$= 15.17 / 40.32 \times 1000$
$= 376$ kcal/kg-MgO Third Invention: Deodorization of Organic Waste Including Food Waste.

An addition of quick lime and/or dolomite to the organic waste causes a hydration reaction by the moisture contained in the organic waste and volatilizes an offensive odor from the organic waste. Malodorous substances causing the offensive odor of the organic waste, i.e., nitrogen compound and sulfur compound react with calcium for chemical deodorization. A physical deodorization is effected by the capture of the malodorous substances through vaporization-based drying and adsorption of the malodorous substances into the pores of the calcium compound. However, the physical deodorizing effect is insignificant.

To maximize the physical deodorizing effect, the present invention adds zeolite, active carbon or bentonite, which is inexpensive but has a high cation exchange capacity (CEC), into the mixer to strongly suppress the volatilization of the malodorous substances in a physical way for perfect deodorization and elimination of the aerobic disgust feeling. The mechanism for digestion and deodorization reaction using quick lime and dolomite is defined as follows:

1. Hydration reaction (a) Hydration with quick lime (CaO)
Reaction formula: $CaO + H_2O \rightarrow Ca(OH)_2$ G energy:

$\Delta G = -214.75 - (-144.25 - 56.69)$
$= -13.81 < 0$ (Forward reaction)

Enthalpy:

$\Delta H = -235.70 - (-151.80 - 68.32)$
$= -15.58 < 0$ (Exothermic reaction)
$= 15.58$ kcal/mol
$= 15.58 / 56.08 \times 1000$
$= 278$ kcal/kg-CaO (b) Hydration with magnesium oxide (MgO)
Reaction formula: $MgO + H_2O \rightarrow Mg(OH)_2$ G energy:

$\Delta G = -199.30 - (-136.00 - 56.69)$
$= -6.61 < 0$ (Forward reaction)

Enthalpy:

$\Delta H = -221.00 - (-143.80 - 68.32)$
$= -8.88 < 0$ (Exothermic reaction)
$= 8.88$ kcal/mol
$= 8.88 / 40.32 \times 1000$
$= 220$ kcal/kg-MgO (c) Hydration with dolomite (0.418 MgO+0.582 CaO)
Reaction formula: $CaMg(CO_3)_2 \rightarrow MgO + CaO + 2CO_2$
Molecular weight: $184.41 - 88.01 \rightarrow 40.32 + 56.08 + 88.01$
Composition ratio: $100\% = 41.8\% + 58.2\% + 0$ Enthalpy:

$\Delta H = 0.418 \times 220 + 0.582 \times 278$
$= 254$ kcal/kg - hard dolomite 2. Deodorization 1) $2(CH_3SH) + CaO \longrightarrow (CH_3S)_2Ca + H_2O$ 2) $2(RCOOH) + CaO \longrightarrow (R\text{—}COO)_2Ca + H_2O$ -continued 4) $Ca(OH)_2 + SOx \longrightarrow CaSO_{x+1} + H_2O$ 5) $CaCO_3 + SOx \longrightarrow CaSO_{x+1} + CO_2 \uparrow$ 6) $Ca(OH)_2 + H_2S \longrightarrow CaS + 2H_2O$ (a) Chemical deodorization (reaction with malodorous substances, i.e., N- or S-containing organic matters)

(b) Physical deodorization

1) The malodorous substances are captured and adsorbed into the pores of $Ca(OH)_2$, $Ca(HCO_3)_2$ and $CaCO_3$ during vaporization and hardening of the organic waste, thereby suppressing the volatilization of the malodorous substances.

2) Zeolite and bentonite have an excellent cation exchange capacity (CEC), a molecular sieving characteristic for selective exchange and organic/inorganic molecular adsorption, and a good catalytic characteristic through a surface activation due to a high void volume. These minerals are readily dehydrated at 350 to 400° C. and show a reabsorption characteristic during a cooling step, so that they are used for a soil and water improving agent, an industrial and urban wastewater purifying agent, a radioactive waste shielding material, a supplement agent for synthetic detergent, a drying agent for dehydration, a contaminant (e.g., $SO_2$) eliminator, a hydrocarbon (e.g., paraffin) extractor, or petroleum purifying agent. The adsorption of the malodorous substances can be affected by addition of a proper amount of zeolite or bentonite as much as at most 3 times the added amount of lime. For satisfaction of the quality, zeolite and bentonite may have a CEC for fertilizer being at least 80 me/100 mg.

3) Active carbon is an absorbent that has a large effective area, i.e., adsorption capacity, because numerous fine pores for adsorption having a diameter of up to 0.4 nm are distributed in the active carbon. The offensive odor can be remarkably adsorbed with less than 0.3 part by weight of the active carbon based on 100 parts by weight of the material to be deodorized. After deodorization, the active carbon acts as a growth promotion agent for microorganisms and plants. For satisfaction of the quality, the active carbon may have an iodine adsorption for tap water purification being about 1,000 mg/g.

Fourth Invention: Manufacture of Weak Alkaline and Deodorizing Calcium/Magnesium/Silica-Enriched Organic Fertilizer.

The fourth invention is directed to a method for manufacturing a weak alkaline calcium/magnesium-enriched organic fertilizer that comprises mixing lime and/or dolomite with organic waste including food waste and performing hydration, dealkalization and deodorization, and also a method for manufacturing a weak alkaline silica-enriched organic fertilizer that comprises mixing a siliceous material such as ironwork slug powder and/or wollastonite powder with the weak alkaline calcium/magnesium-enriched organic fertilizer.

Fifth Invention: Manufacture of Customized Fertilizer from Organic Waste Including Food Waste.

The fifth invention is directed to a method for manufacturing a weak alkaline customized organic fertilizer suitable for the ingredients of a specific soil that comprises mixing, as a second additive, zeolite or bentonite for improving CEC, active carbon or charcoal and graphite for supplying the carbon element, sawdust for control of moisture adsorption, clay minerals for supplying micronutrient elements, a neutralizer for overconcentrated salts, or other organic matters with the weak alkaline deodorizing calcium/magnesium/silica-enriched organic fertilizer manufactured according to the fourth invention.

Sixth Invention: Manufacture of Functional Plant Agents.

The sixth invention is directed to a method for manufacturing a functional plant agent for treating and preventing a destruction of plants or a deterioration of the strength and resistance of the plants from acid rain and enhancing the absorption of water to promote the growth and yield increase of the plants. The functional agent is prepared by mixing, in a mixer 43 shown in FIG. 1, a functionality provider with the desalted, weak alkaline deodorized organic fertilizer manufactured from organic waste including food waste according to the first to fifth inventions, and drying the mixture at the granulation units 45 and 47. The added amount of the functionality provider is controlled in balance with the amount of the lime component applied to the soil. A neutralizing lime amount is defined as an amount of alkali required for control of pH 1 in a depth of up to 10 cm per soil area of 10 a (lime amount=CaO %+MgO×1.3914%). The neutralizing lime amount is about 60 kg for sandy soil, 130 kg for general soil, or 250 kg for volcanic ash soil. It is recommended in Korea to apply 200 kg of hydrated lime to a farm land having a pH value of less than 6.5 every three year. That is, the recommended amount of fertilizer is annually 50.45 kg of lime per 1000 m². An optimum area for 1 kg of the organic fertilizer according to the present invention for annual application of neutralizing lime is about 10 m² ($\approx$1 kg×0.5÷50.45 kg/1000 m², because about 10% of the organic waste is decomposed and volatilized during digestion using 10% of lime added to 15% of the solid content of the food waste and the solid content of the organic fertilizer contains about 50% of lime per 50% of the organic waste).

Now, a description will be given to a method for manufacturing the functionality provider.

The functionality provider greatly enhances the plants' absorption of calcium ions and provides a therapeutic and preventive effect on the deficiency of calcium in plants. The functionality provider is prepared by mixing, based on 100 parts by weight of acetic acid, 0.7 part by weight of chitosan, 14 parts by weight of boric acid, 10 parts by weight of ferric chloride and 0.5 part by weight of ascorbic acid at a temperature of 30 to 40° C. with agitating, and standing the mixture for more than 24 hours. The functionality provider extracts a boron ingredient related to metabolism of nitrogen and hydrocarbon from boric acid, an iron ingredient from ferric chloride, and an ingredient for improving antioxidization and the resistance to disease-causing germs from ascorbic acid. The acetic acid reacts with calcium supplied from the hydrated lime to produce calcium acetate that acts as a catalyst for organic synthesis ($2CH_3COOH+CaCO_3 \rightarrow Ca(CH_3COO)_2+H_2O+CO_2$).

Now, a description will be given to a method for manufacturing a plant functionality promoter, which is an improvement of the method for manufacturing a plant functionality provider.

The plant functionality promoter uses dolomite powder instead of an organic fertilizer as a calcium and magnesium resource. The plant functionality promoter is manufactured by mixing, based on 100 parts by weight of acetic acid, 100 parts by weight of dolomite powder, 0.7 part by weight of chitosan, 14 parts by weight of boric acid, 10 parts by weight of ferric chloride, and 0.5 part by weight of ascorbic acid with 850 parts by weight of water, agitating the mixture at a temperature of 30 to 40° C., and standing it for more than 24 hours or separating the residual material from the mixture with a 325 mesh sieve or powdering the mixture through dehydration, drying and pulverizing. The plant functionality promoter is applied in the form of an undiluted solution or a 200 to 400-fold diluted solution in water alone or in combination with an organic fertilizer together with a functionality provider for gardening of garden plants or lawn.

The principal ingredient of the functionality provider is aqueous chitosan and/or its derivatives having a molecular weight of less than 30,000. Chitosan is used in various applications, including metal adsorbent, immobilizing carrier for microorganism and enzyme, medical preparation for artificial skin or sustained-release or slow-release carrier, coagulating agent, functional food, agricultural chemical, germination promoter, cosmetics or the like. It is reported that the chitosan combines with the residual agricultural chemicals to inactivate the agricultural chemicals, enhances the plants' resistance to disease, cold weather and heat, and promotes the growth of the plant root and division and multiplication of plants.

Chitosan and its derivatives promotes a combination of $Ca^{2+}$ and calmodulin that is a $Ca^{2+}$ receptor distributed in the plant cells so that one molecular of calmodulin is combined with four $Ca^{2+}$ absorbed by the root. The calmodulin combined with $Ca^{2+}$ activates inert enzymes such as α-amylase, ATPase, NAD kinase, myosin L type kinase to remarkably enhance the mobility of $Ca^{2+}$ into leaves, fruits, trunks and stem, and thus same the above the absorption of $Ca^{2+}$ by the root is also remarkably enchanced, thereby treating and preventing all the conditions and damages from the $Ca^{2+}$ deficiency of the plants.

It is considered that about 8 kg of the functional plant agent is diluted in about 200-fold water and about 130 kg of the diluted solution of the functional plant agent is monthly applied to the soil of 1000 m² for the annual area. However, the amount of the functional plant agent to be applied is depended on the acidity of the soil, the size and kind of the target plants, and the calcium content of the plants. The added amount of the functionality provider balanced with the standard application amount of the neutralizing lime is about 15% of the quick lime (8 kg/50.45 kg). To maximize the mixing effect, the functionality provider is diluted in 200-fold water, mixed with a binder in the sprayed state at a mixer and subjected to granulation and drying. As such, a functional plant agent for fertilizer can be manufactured in balance with the applied amount of the neutralizing lime.

As for the chitosan, use can be made of chitosan or its derivatives that have an average molecular weight of less than 30,000 and are capable of being diluted in an aqueous organic acid. Examples of the chitosan may include 1,4)-2-amini-2-deoxy- -D-glucan,N-carboxym-ethyl, glycol chitosan, chitosan phosphate, N-salicylidene, 4-nitrobenzylidene, N-(O-carboxybenzyl), dicarbamate, chtosan-2,5-anhydromannose, chitosan-heparin, or chitosan-dextran sulfuric acid. Examples of the aqueous organic acid may include acetic acid, lactic acid, aspartic acid, DL-aspartic acid, or citric acid. Examples of the binder may include solutions of starch paste, hydroxypropy cellulose, carboxymethy cllulose gum arabic, gelatin, glucose, sugar, tragath, or sodium, calginate.

Now, a description will be given to the first additives of the present invention, i.e., quick lime and dolomite.

The quick lime is prepared from limestone calcining at a temperature of at least 900° C. for decarbonation ($CaCO_3 \rightarrow CaO+CO_2$). The hard dolomite is prepared from dolomite burnt at a temperature of at least 750° C. for decarbonation ($Ca \cdot Mg(CO_3)_2 \rightarrow MgO+CaO+2CO_2$). The two products are producible in the same calcining kiln because the process is the same. The properties of the products are greatly dependent on the degree of burning, which is largely classified into dead burn, hard burn and soft burn. The degree of burning determines the properties of the products such as activity (reactivity), crystal size, specific surface area, porosity and specific gravity. Soft burn is a longer time burning method at a low temperature. Alternatively, sodium chloride is added for chlorination in order to enhance the activity.

The quick lime and dolomite used in the present invention are recommended to be a soft burnt product that has a high reactivity. In the industrial production, use is made of about 143 kg/ton-CaO of solid fuel having a fuel unit of 1,000 kcal/kg CaO and a calorific value of 7,000 cal/g.

The carbonate gas ($CO_2$) used in the carbonation of the present invention is a total $CO_2$ generated from heat decomposition of limestone and dolomite and $CO_2$ from combustion of the fuel. For lime, the decarbonated amount of limestone is 0.786 kg-$CO_2$/kg-CaO ($CaCO_3/CaO \times CO_2/CaCO_3 = 100/56 \times 44/100$). The amount of $CO_2$ generated from combustion of 143 kg of the fuel is 0.334 kg-$CO_2$/kg-CaO (0.143 kg-C/kg-CaO×0.58 kg-OE/kg-C×4.033 kg-$CO_2$/kg-OE). Accordingly, the amount of $CO_2$ generated from the limestone and the fuel when producing 1 kg of quick lime is 1.12 kg-$CO_2$/kg-CaO. The amount of $CO_2$ is enough to carbonate the quick lime, because the carbonated amount of quick lime added for hydration with $CO_2$ generated when producing 1 kg of quick lime is theoretically 1.425 kg-CaO. $Ca(OH)_2$ participates in carbonation with $CO_2$ contained in the atmosphere, of which the concentration is no more than 0.03% that is too negligible to reduce the pH value through the reaction with the atmosphere.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiments of the present invention, examples of which are illustrated in the accompanying drawings.

Embodiment 1: Desalting of organic waste including food waste.

Night soil and food waste were mixed at a mixing ratio of 1:4. To 100 kg of the resulting organic waste containing 85% of water was added 4 kg of waste gypsum powder. The mixture was agitated in a tank at 60 rpm for 30 minutes to yield 104 kg of the desalted organic waste. The properties of the organic waste desalted according to Embodiment 1 of the present invention are presented in Table 1.

Embodiment 2: Manufacture of weak alkaline calcium-enriched organic fertilizer (using 10% of lime).

Night soil and food waste were mixed at a mixing ratio of 1:4. To 100 kg of the resulting organic waste containing 85% of water was added 4 kg of waste gypsum powder. The mixture was agitated in a tank at 60 rpm for 30 minutes to yield 104 kg of the desalted organic waste. After adding 10 kg of solid lime, the mixture was subjected to digestion in a ribbon blender for 30 minutes to yield 114 kg of a calcium-enriched organic fertilizer in the slurry form. Subsequently, a pure $CO_2$ gas diluted to have a concentration of 30% was introduced into the calcium-enriched organic fertilizer in a cylindrical batch reactor and the mixture was stirred at 60 rpm for 30 minutes for carbonation to yield 121.50 kg of a weak alkaline calcium-enriched organic fertilizer. The pH value of the composition is presented in Table 2.

Embodiment 3: Manufacture of weak alkaline calcium-enriched organic fertilizer (using 25% of lime).

Night soil and food waste were mixed at a mixing ratio of 1:4. To 100 kg of the resulting organic waste containing 85% of water was added 4 kg of waste gypsum powder. The mixture was agitated in a tank at 60 rpm for 30 minutes to yield 104 kg of the desalted organic waste. After adding 25 kg of solid quick lime, the mixture was subjected to hydration in a ribbon blender for 30 minutes to yield 129 kg of a calcium-enriched organic fertilizer in the slurry form. Subsequently, a pure $CO_2$ gas diluted to have a concentration of 30% was introduced into the calcium-enriched organic fertilizer in a cylindrical batch reactor and the mixture was agitated at 60 rpm for 30 minutes for carbonation to yield 147.50 kg of a weak alkaline calcium-enriched organic fertilizer. The pH value of the composition is presented in Table 2.

Embodiment 4: Manufacture of weak alkaline magnesium-enriched organic fertilizer (using 10% of dolomite).

Night soil and food waste were mixed at a mixing ratio of 1:4. To 100 kg of the resulting organic waste containing 85% of water was added 4 kg of waste gypsum powder. The mixture was agitated in a tank at 60 rpm for 30 minutes to yield 104 kg of the desalted organic waste. After adding 10 kg of solid dolomite, the mixture was subjected to hydration in a ribbon blender for 30 minutes to yield 114 kg of a magnesium-enriched organic fertilizer in the slurry form. Subsequently, a pure $CO_2$ gas diluted to have a concentration of 30% was introduced into the magnesium-enriched organic fertilizer in a cylindrical batch reactor and the mixture was agitated at 60 rpm for 30 minutes for carbonation to yield 122.50 kg of a weak alkaline magnesium-enriched organic fertilizer. The pH value of the composition is presented in Table 2.

Embodiment 5: Manufacture of weak alkaline magnesium-enriched organic fertilizer (using 25% of hard dolomite).

Night soil and food waste were mixed at a mixing ratio of 1:4. To 100 kg of the resulting organic waste containing 85% of water was added 4 kg of waste gypsum powder. The mixture was agitated in a tank at 60 rpm for 30 minutes to yield 104 kg of the desalted organic waste. After adding 25 kg of solid hard dolomite, the mixture was subjected to hydration in a ribbon blender for 30 minutes to yield 129 kg of a magnesium-enriched organic fertilizer in the slurry form. Subsequently, a pure $CO_2$ gas diluted to have a concentration of 30% was introduced into the magnesium-enriched organic fertilizer in a cylindrical batch reactor and the mixture was agitated at 60 rpm for 30 minutes for carbonation to yield 150.20 kg of a weak alkaline magnesium-enriched organic fertilizer. The pH value of the composition is presented in Table 2.

Embodiment 6: Manufacture of weak alkaline silica-enriched organic fertilizer.

Night soil and food waste were mixed at a mixing ratio of 1:4. To 100 kg of the resulting organic waste containing 85% of water was added 4 kg of waste gypsum powder. The mixture was agitated in a tank at 60 rpm for 30 minutes to yield 104 kg of the desalted organic waste. After adding 10 kg of solid lime, the mixture was subjected to hydration in a ribbon blender for 30 minutes to yield 114 kg of a calcium-enriched organic fertilizer in the slurry form. Subsequently, a pure $CO_2$ gas diluted to have a concentration of 30% was introduced into the silica-enriched organic fertilizer in a cylindrical batch reactor and the mixture was agitated at 60 rpm for 30 minutes for carbonation to yield 121.50 kg of a weak alkaline calcium-enriched organic fertilizer. After adding 30 kg of a powdered smelting slag, the mixture was admixed in a ribbon blender for 30 minutes to prepare 151.50 kg of a weak alkaline silica-enriched organic fertilizer. The properties of the composition are presented in Table 3.

Embodiment 7: Manufacture of weak alkaline deodorized calcium-enriched organic fertilizer.

Night soil and food waste were mixed at a mixing ratio of 1:4. To 100 kg of the resulting organic waste containing 85% of water was added 4 kg of waste gypsum powder. The mixture was agitated in a tank at 60 rpm for 30 minutes to yield 104 kg of the desalted organic waste. After adding 10 kg of solid quick lime, the mixture was subjected to hydration in a ribbon blender for 30 minutes to yield 114 kg of a calcium-enriched organic fertilizer in the slurry form. Subsequently, a pure $CO_2$ gas diluted to have a concentration of 30% was introduced into the silica-enriched organic fertilizer in a cylindrical batch reactor and the mixture was agitated at 60 rpm for 30 minutes for carbonation to yield 121.50 kg of a weak alkaline calcium-enriched organic fertilizer. After adding 300 g of an active carbon powder, the mixture was admixed in a ribbon blender for 2 hours to prepare 121.80 kg of a weak alkaline deodorized calcium-enriched organic fertilizer. The results of the volatilization test for the malodorous substance of the composition are presented in Table 4.

In the volatilization test, 1 kg of a sample was added into a vinyl bag of 1 $m^3$ in volume and the vinyl bag was hermetically sealed. After standing the sample for one hour, the gas was collected with a gas collector to measure the concentrations of the malodorous substances, $NH_3$ and $H_2S$ and determine the degree of the offensive odor by the olfactory sense.

Embodiment 8: Manufacture of weak alkaline functional plant agent.

Night soil and food waste were mixed at a mixing ratio of 1:4. To 100 kg of the resulting organic waste containing 85% of water was added 4 kg of waste gypsum powder. The mixture was agitated in a tank at 60 rpm for 30 minutes to yield 104 kg of the desalted organic waste. After adding 10 kg of solid lime, the mixture was subjected to hydration in a ribbon blender for 30 minutes to yield 114 kg of a calcium-enriched organic fertilizer in the slurry form. Subsequently, a pure $CO_2$ gas diluted to have a concentration of 30% was introduced into the silica-enriched organic fertilizer in a cylindrical batch reactor and the mixture was agitated at 60 rpm for 30 minutes for carbonation to yield 121.50 kg of a weak alkaline calcium-enriched organic fertilizer. After adding 300 g of an active carbon powder, the mixture was admixed in a ribbon blender for 2 hours to prepare 121.80 kg of a weak alkaline deodorized calcium-enriched organic fertilizer.

Subsequently, 130 g of a functionality provider manufactured by the present invention was diluted in 200-fold water, mixed with a small amount of starch and subjected to granulation and drying, to prepare 41.00 kg of a weak alkaline functional plant agent containing 10% of water.

Comparative Embodiment 1: Desalting of organic waste including food waste.

Night soil and food waste were mixed at a mixing ratio of 1:4. To 100 kg of the resulting organic waste containing 85% of water was added 4 kg of waste gypsum powder. The mixture was stood in a tank for 30 minutes to eliminate saline matters from the organic waste. The properties of the desalted organic waste are presented in Table 1.

Comparative Embodiment 2: Manufacture of calcium-enriched organic fertilizer (using 10% of quick lime).

Night soil and food waste were mixed at a mixing ratio of 1:4. To 100 kg of the resulting organic waste containing 85% of water was added 4 kg of waste gypsum powder. The mixture was agitated in a tank at 60 rpm for 30 minutes to yield 104 kg of the desalted organic waste. After adding 10 kg of solid lime, the mixture was subjected to hydration in a ribbon blender for 30 minutes to yield 114 kg of a calcium-enriched organic fertilizer in the slurry form. The pH value of the composition is presented in Table 2.

Comparative Embodiment 3: Manufacture of calcium-enriched organic fertilizer (using 25% of quick lime).

Night soil and food waste were mixed at a mixing ratio of 1:4. To 100 kg of the resulting organic waste containing 85% of water was added 4 kg of waste gypsum powder. The mixture was agitated in a tank at 60 rpm for 30 minutes to yield 104 kg of the desalted organic waste. After adding 25 kg of solid lime, the mixture was subjected to hydration in a ribbon blender for 30 minutes to yield 129 kg of a calcium-enriched organic fertilizer in the slurry form. The pH value of the composition is presented in Table 2.

Comparative Embodiment 4: Manufacture of magnesium-enriched organic fertilizer (using 10% of dolomite).

Night soil and food waste were mixed at a mixing ratio of 1:4. To 100 kg of the resulting organic waste containing 85% of water was added 4 kg of waste gypsum powder. The mixture was agitated in a tank at 60 rpm for 30 minutes to yield 104 kg of the desalted organic waste. After adding 10 kg of solid hard dolomite, the mixture was subjected to hydration in a ribbon blender for 30 minutes to yield 114 kg of a magnesium-enriched organic fertilizer in the slurry form. The pH value of the composition is presented in Table 2.

Comparative Embodiment 5: Manufacture of magnesium-enriched organic fertilizer (using 25% of dolomite).

Night soil and food waste were mixed at a mixing ratio of 1:4. To 100 kg of the resulting organic waste containing 85% of water was added 4 kg of waste gypsum powder. The mixture was agitated in a tank at 60 rpm for 30 minutes to yield 104 kg of the desalted organic waste. After adding 25 kg of solid hard dolomite, the mixture was subjected to hydration in a ribbon blender for 30 minutes to yield 150.20 kg of a magnesium-enriched organic fertilizer in the slurry form. The pH value of the composition is presented in Table 2.

Comparative Embodiment 6: Manufacture of silica-enriched organic fertilizer (using 10% of quick lime).

Night soil and food waste were mixed at a mixing ratio of 1:4. To 100 kg of the resulting organic waste containing 85% of water was added 4 kg of waste gypsum powder. The mixture was agitated in a tank at 60 rpm for 30 minutes to yield 104 kg of the desalted organic waste. After adding 10 kg of solid lime, the mixture was subjected to hydration in a ribbon blender for 30 minutes to yield 114 kg of a calcium-enriched organic fertilizer in the slurry form. Subsequently, a pure $CO_2$ gas diluted to have a concentration of 30% was introduced into the silica-enriched organic fertilizer in a cylindrical batch reactor and the mixture was stirred at 60 rpm for 30 minutes for carbonation to yield 121.50 kg of a weak alkaline calcium-enriched organic fertilizer. The properties of the composition are presented in Table 3.

Comparative Embodiment 7: Manufacture of weak alkaline non-deodorized calcium-enriched organic fertilizer (using 10% of quick lime).

Night soil and food waste were mixed at a mixing ratio of 1:4. To 100 kg of the resulting organic waste containing 85% of water was added 4 kg of waste gypsum powder. The mixture was agitated in a tank at 60 rpm for 30 minutes to yield 104 kg of the desalted organic waste. After adding 10 kg of solid lime, the mixture was subjected to hydration in a ribbon blender for 30 minutes to yield 114 kg of a calcium-enriched organic fertilizer in the slurry form. Subsequently, a pure $CO_2$ gas diluted to have a concentration of 30% was introduced into the silica-enriched organic fertilizer in a cylindrical batch reactor and the mixture was agitated at 60 rpm for 30 minutes for carbonation to yield 121.50 kg of a weak alkaline calcium-enriched organic fertilizer. The results of the volatilization test for the malodorous substance of the composition are presented in Table 4. The volatilization test was performed in the same manner as described in Example 7.

Comparative Embodiment 8: Manufacture of weak alkaline functional plant agent (without using a functionality provider).

121.80 kg of a weak alkaline functional plant agent was prepared in the same manner as described in Embodiment 7.

The weak alkaline functional plant agent prepared in Embodiment 8 and Comparative Embodiment 8 were subjected to a test for the growth of lettuce to measure the growth amount and the calcium content of the lettuce. The results are presented in Table 5.

TABLE 1

Properties of organic wastes.
unit: %

| Div. | H$_2$O | pH | Organic matter | Calcium | Saline Matter | Ref. |
| --- | --- | --- | --- | --- | --- | --- |
| Organic waste | 84.50 | 7.70 | 75.00 | 1.80 | 3.57 | Night soil/food waste |
| Embodiment 1 | 81.30 | 7.70 | 72.10 | 1.73 | 0.05 | Agitated at 60 rpm |
| Comparative Embodiment 1 | 81.30 | 7.70 | 72.10 | 1.73 | 1.10 | Mixed standing |

TABLE 2 pH value of calcium-enriched organic fertilizers (carbonation).

| Div. | Addition of lime | Carbonation | PH | Temperature |
| --- | --- | --- | --- | --- |
| Embodiment 2 | 10 kg - CaO | 30 min. | 10.10 | 33° C. |
| Comparative Embodiment 2 | 10 kg - CaO | — | 12.64 | 28° C. |
| Embodiment 3 | 25 kg - CaO | 30 min. | 10.20 | 46° C. |
| Comparative Embodiment 3 | 25 kg - CaO | — | 12.58 | 33° C. |
| Embodiment 4 | 10 kg - Dol | 30 min. | 9.81 | 88° C. |
| Comparative Embodiment 4 | 10 kg - Dol | — | 12.27 | 51° C. |
| Embodiment 5 | 25 kg - Dol | 30 min. | 9.90 | 100° C. |
| Comparative Embodiment 5 | 25 kg - Dol | — | 12.43 | 82° C. |

TABLE 3

Properties of silica-enriched organic fertilizers.

| Div. | Addition of CaO | Addition of silicic acid | CaO % | Silicic acid % |
| --- | --- | --- | --- | --- |
| Embodiment 6 | 10 kg | 30 kg | 35.40 | 8.03 |
| Comparative Embodiment 6 | 10 kg | — | 27.50 | 1.10 |

TABLE 4

Results of volatilization test for malodorous substances
Unit: ppm

| Div. | NH$_3$ | H$_2$S | Before hydration | After hydration After 2 hours | Before hydration | After hydration After 2 hours |
| --- | --- | --- | --- | --- | --- | --- |
| Embodiment 7 | 34 | 1,340 | 86 | 0.46 | 1.06 | 0.14 |
| Comparative Embodiment 7 | 34 | 1,340 | 413 | 0.46 | 1.06 | 0.52 |

TABLE 5

Results of cultivation test for lettuce using weak alkaline functional plant agents.

| Div. | Dry weight | Calcium content | Ref. |
| --- | --- | --- | --- |
| Embodiment 8 | 700 g/10 weeks | 988 mg/100 g | Functional plant agents |
| Comparative Embodiment 8 | 550 g/10 weeks | 918 mg/100 g | Calcium-enriched organic fertilizer |

Cultivation Conditions

After applying a compound fertilizer having a composition of N:P:K=4:6:2 to a 2m$^2$-area farm land at a ratio of 100 g/m$^2$, the functional plant agent and the calcium-enriched organic fertilizer prepared in Embodiment 8 and Comparative Embodiment 8 were applied each in an amount of 100 g/m$^2$. After an elapse of 10 days of germination, 20 elite plants are selected and grown for 60 days for harvest and analysis.

As described above, the present invention utilizes organic waste including food waste, which still remains problematic to the environmental pollution because of the incomplete recycling technology in the economical aspect, in such a manner that the organic waste is subjected to desalting, hydration with lime available in a large amount at a low cost, sterilization and deodorization, and carbonation to a weak alkaline fertilizer, and recyclable as an organic fertilizer or a soil conditioner with additional useful soil ingredients. Accordingly, the present invention enables to treat the organic waste including food waste in an economical and effective way, contributing to the environmental preservation and the organic farming. The present invention also provides a functional plant agent and a plant functionality promoter for prevention of damages on mountains and forests from acid rain and application to special gardening for high-value garden plants and lawn.

In conclusion, the present invention is considered as a most effective sound treatment method for organic waste including food waste that conforms to the good-circulation law of the nature and is applicable by anyone in any where.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method for manufacturing a weak alkaline organic fertilizer from organic waste including food waste, the method comprising the steps of:
   (a) adding 0.1 to 5 parts by weight of a desalter based on 100 parts by weight of the organic waste including food waste with agitating to remove saline matters from the organic waste;
   (b) adding 5 to 40 parts by weight of quick lime or dolomite based on 100 parts by weight of the organic waste to the product of the step (a) for hydration;
   (c) mixing the product of the step (b) with agitating for aging;
   (d) mixing the product of the step (c) and adding an ingredient improver of the product;
   (e) adding a deodorizer to the product of the step (d) with agitating for elimination of malodorous volatile matters from the product and deodorization; and
   (f) adding a carbon dioxide gas or a combustion gas containing the carbon dioxide gas to the product of the step (d) to cause a carbonation with the hydrated lime and/or dolomite in the order of the steps (d), (c) and (b).

2. The method as claimed in claim 1, wherein the desalter is selected from the group consisting of waste gypsum and gypsum ($CaSO_4$), calcium carbonate ($CaCO_3$) or calcium chloride ($CaCl_2$).

3. The method as claimed in claim 1, wherein the ingredient improver is selected from the group consisting of a siliceous material, including wollastonite powder or slags of ironwork byproducts; a carbon ingredient, including graphite, active carbon or charcoal; sawdust for control of moisture absorption; bentonite or zeolite for improving a cation exchange capacity; supplementary organic matters, including farmyard manure, fish cake, oil cake or sludge; and clay minerals for supplying micronutrient elements.

4. The method as claimed in claim 1, wherein the deodorizer is selected from the group consisting of active carbon, zeolite, bentonite, and charcoal.

5. A method for manufacturing a plant functionality provider, comprising the steps of: mixing, based on 100 parts by weight of acetic acid, 0.3 to 1.0 part by weight of chitosan and/or its derivative having a molecular weight of less than 30,000, 10 to 18 parts by weight of boric acid, 5 to 15 parts by weight of ferric chloride and 0.2 to 0, 8 part by weight of ascorbic acid at a temperature of 30 to 40° C. with sufficient agitating, and standing the mixture for at least 24 hours to enhance the plants' absorption of nutriment such as calcium.

6. A method for manufacturing a functional plant agent, comprising the step of mixing 0.5 to 6 parts by weight of the plant functionality provider according to claim 5 with 100 parts by weight of the individual organic fertilizer according to claim 1.

7. A method for manufacturing a plant functionality promoter, comprising the steps of:
   (a) mixing, based on 100 parts by weight of acetic acid, 800 to 850 parts by weight of water and 70 to 130 parts by weight of dolomite powder at a temperature of 30 to 40° C. with agitating;
   (b) adding 0.3 to 1.0 part by weight of chitosan and/or its derivative having a molecular weight of less than 30,000, 10 to 18 parts by weight of boric acid, 5 to 15 parts by weight of ferric chloride, and 0.2 to 0.8 part by weight of ascorbic acid, with agitating;
   (c) standing the resulting mixture of the step (b) for at least 24 hours; and/or
   (d) powdering the resulting mixture of the step (c) through dehydration, drying and pulverization.

8. A method for manufacturing a functional plant agent, comprising the step of adding 0.5 to 6 parts by weight of the plant functionality promoter according to claim 7 based on 100 parts by weight of the individual fertilizer according to claim 1.

* * * * *